US008826229B2

(12) United States Patent
Foti (10) Patent No.: US 8,826,229 B2
(45) Date of Patent: Sep. 2, 2014

(54) IMMUTABLE PROPERTIES IN A CLASS

(75) Inventor: David A. Foti, Holliston, MA (US)

(73) Assignee: The Mathworks, Inc., Natick, MA (US)

( * ) Notice: Subject to any disclaimer, the term of this patent is extended or adjusted under 35 U.S.C. 154(b) by 89 days.

(21) Appl. No.: 13/151,783

(22) Filed: Jun. 2, 2011

(65) Prior Publication Data

US 2012/0311532 A1 Dec. 6, 2012

(51) Int. Cl.
*G06F 9/45* (2006.01)
*G06F 9/44* (2006.01)

(52) U.S. Cl.
CPC ........................................ *G06F 9/44* (2013.01)
USPC ........... 717/108; 717/106; 717/110; 717/116; 717/118

(58) Field of Classification Search
None
See application file for complete search history.

(56) References Cited

U.S. PATENT DOCUMENTS

| 5,564,048 | A  | * | 10/1996 | Eick et al. ............................... 1/1 |
| 6,263,379 | B1 | * | 7/2001  | Atkinson et al. .............. 719/332 |
| 7,219,340 | B2 | * | 5/2007  | Schechter et al. ............ 717/144 |
| 8,091,069 | B2 | * | 1/2012  | Rojer ............................. 717/114 |
| 8,260,792 | B1 | * | 9/2012  | Hsu ............................... 707/756 |
| 2005/0216883 | A1 | * | 9/2005 | Ishimitsu et al. ............. 717/105 |
| 2006/0206905 | A1 | * | 9/2006 | Werner ......................... 719/330 |
| 2009/0327999 | A1 | * | 12/2009 | Duffy et al. ................... 717/116 |

OTHER PUBLICATIONS

Hejlsberg et al., The C# Programming Language (Covering C# 4.0), Fourth Edition, Addison-Wesley Professional, Oct. 31, 2010, pp. 6-8, 21, 26-27, 59-60, 154, 166-167, 511-513, 663-669, and 756.*
Gomes, Benedict A., "Value Classes", Jun. 6, 1997, pp. 1-3.*
"MATLAB 7 Object-Oriented Programming", Release 2011(a), revised for version 7.12, Apr. 2011, See Ch.5 and Ch.6, specifically cited portions in Office Action.*

* cited by examiner

*Primary Examiner* — Isaac Tecklu
(74) *Attorney, Agent, or Firm* — Harrity & Harrity, LLP (57) ABSTRACT

In an embodiment, a class definition of a class may provide an indication whether a property, which is part of the class, is immutable. The indication may be made implicitly or explicitly. A value of the property may be established (e.g., set) during a creation of an instance of the class. An attempt to set the value of the property after the instance is created may be disallowed. Further, an error (e.g., an error message, exception condition) may be reported in response to disallowing the attempt.

20 Claims, 8 Drawing Sheets

```
classdef Bond
        enumeration
                A3      ('Prime')
                A2      ('High')
                A       ('Medium')
                B3      ('LowMedium')          } 320
                B2      ('HighlySpeculative')
                C       ('ExtremelySpeculative')
                D       ('Default')
        end
        properties
                Grade          ~ 330
        end
        methods
                function e = Bond (grade)
                        e.Grade = grade;        } 340
                end
        end
    end
end
```

```
                        COMMAND LINE

>> prime1 = Bond.A3        410

>> isequal (prime1, Bond.A3)    420
ans =
       true         }  430

>> prime1.Grade       440
ans =
       Prime        }  450

>> prime1.Grade = 'Speculative'    460
??? Error using ==> prime1
Setting the 'Grade' property of the 'Bond' class is not allowed   } 470

>> prime2 = Bond.A3     480

>> prime2.Grade
ans =
       Prime        }  490
```

```
classdef Bird < handle
        enumeration
                Cardinal    ('Medium', 'Red', 'ForestEdge')
                Chickadee   ('Tiny', 'BlackWhite', 'ForestEdge')
                Woodpecker  ('Large', 'RedBlack', 'DeepForest')   }  530
                Sparrow     ('Tiny', 'Brown', 'Suburban')
                Pigeon      ('Large', 'MultiColored', 'Urban')
        end
        properties (SetAccess = immutable)
                Size  }  550
                Color
        end
        properties
                Habitat  ~ 560
        end
        methods
                function d = Bird (size, color, habitat)
                        d.Size = size;
                        d.Color = color;                          }  570
                        d.Habitat = habitat;
                end
        end
    end
end
```

```
                          COMMAND LINE

>> Aves = Sparrow  ⌒ 620

>> Aves.Size = Medium  ⌒ 625
??? Error using ==> Aves                                      ⎫
Setting the 'Size' property of the 'Bird' class is not allowed ⎬ 630
                                                              ⎭

>> Aves.Habitat  ⌒ 635
ans =            ⎫
                 ⎬ 640
    Suburban     ⎭

>> Oiseaux = Sparrow  ⌒ 645

>> Oiseaux.Habitat  ⌒ 650
ans =            ⎫
                 ⎬ 655
    Suburban     ⎭

>> Aves.Habitat = Urban  ⌒ 660

>> Aves.Habitat  ⌒ 665
ans =            ⎫
                 ⎬ 670
    Urban        ⎭

>> Oiseaux.Habitat  ⌒ 675
ans =            ⎫
                 ⎬ 680
    Urban        ⎭
```

IMMUTABLE PROPERTIES IN A CLASS

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar features illustrated in the drawings.

One or more embodiments of the invention may be implemented on one or more computing devices. The one or more computing devices may be a system or part of a system. The one or more computing devices may include, for example, a desktop computer, laptop computer, client computer, server computer, mainframe computer, personal digital assistant (PDA), netbook computer, tablet computer, web-enabled cellular telephone, smart phone, or some other computing device.

Figure 1:
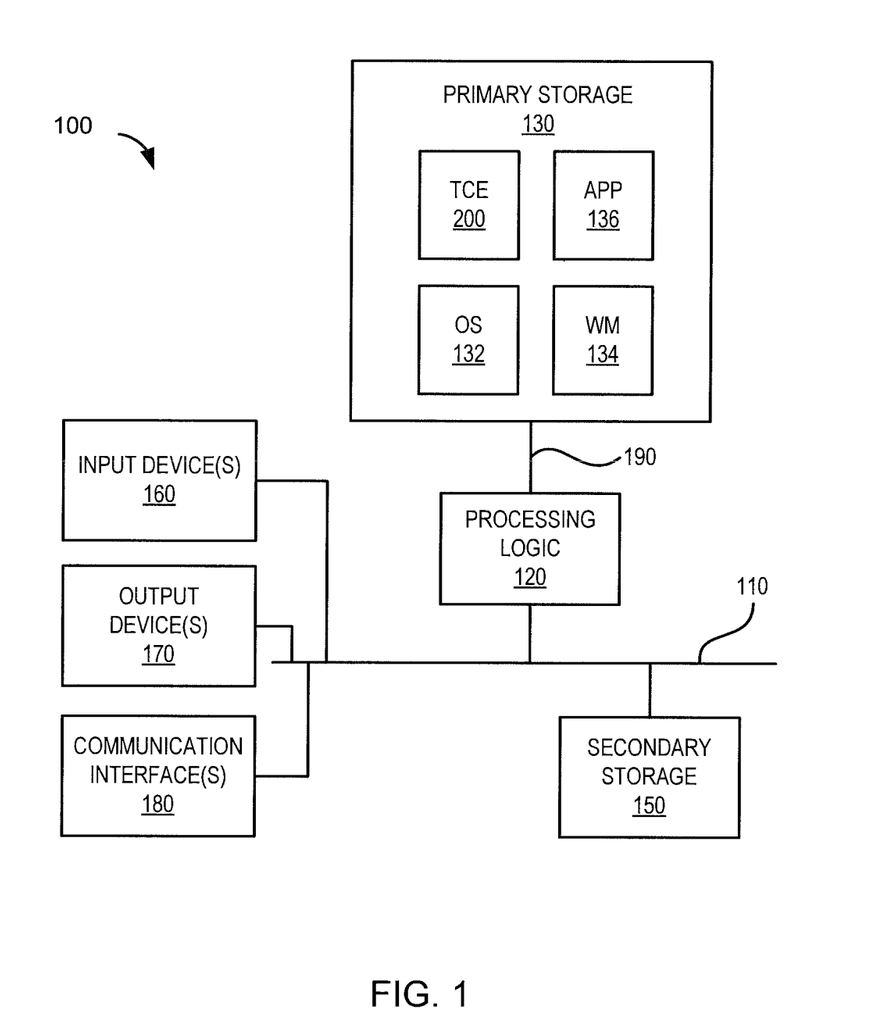
FIG. 1 illustrates a block diagram of an example of a computing device that may implement one or more embodiments of the invention.

FIG. 1 illustrates an example of a computing device 100 that may implement one or more embodiments of the invention. Referring to FIG. 1, the computing device 100 may include one or more components, such as processing logic 120, primary storage 130, secondary storage 150, one or more input devices 160, one or more output devices 170, and one or more communication interfaces 180, that may be connected together by one or more buses, such as input-output (I/O) bus 110 and memory bus 190. Note that computing device 100 is an example of a computing device that may implement one or more embodiments of the invention. Other computing devices that may be less complicated or more complicated than computing device 100 may implement one or more embodiments of the invention.

The I/O bus 110 may be an interconnect bus that may enable communication between various components in the computing device 100, such as processing logic 120, secondary storage 150, input devices 160, output devices 170, and communication interfaces 180. The communication may include, among other things, transferring information (e.g., data, control information, executable instructions) between the components.

The memory bus 190 may be an interconnect bus that may enable information to be transferred between the processing logic 120 and the primary storage 130. The information may include instructions and/or data that may be executed, manipulated, and/or otherwise processed by processing logic 120. The instructions and/or data may include instructions and/or data that may implement one or more embodiments of the invention.

The processing logic 120 may include logic that may interpret, execute, and/or otherwise process information contained in, for example, the primary storage 130 and/or secondary storage 150. The information may include computer-executable instructions and/or data that may implement one or more embodiments of the invention. The processing logic 120 may comprise a variety of heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processing logic 120 may comprise a single core or multiple cores. Moreover, processing logic 120 may comprise a system-on-chip (SoC) or system-in-package (SiP). An example of a processor that may be used to implement processing logic 120 is the Intel® Xeon® processor available from Intel Corporation, Santa Clara, Calif.

The secondary storage 150 may be accessible to the processing logic 120 via I/O bus 110. The secondary storage 150 may store information for the processing logic 120. The information may be executed, interpreted, manipulated, and/or otherwise processed by the processing logic 120. The secondary storage 150 may comprise, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention.

Input devices 160 may include one or more devices that may be used to input information into computing device 100. Examples of devices that may be used to input information into computing device 100 may include a keyboard (e.g., hardware keyboard, software keyboard), computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, eyeball controlled device, finger mouse, light pen, light gun, neural device, eye tracking device, gesture tracking device, steering wheel, yoke, jog dial, space ball, directional pad, dance pad, soap mouse, haptic device, tactile device, neural device, multipoint input device, discrete pointing device, or some other input device. The information may include spatial (e.g., continuous, multidimensional) data that may be input into computing device 100, for example, using a device such as a computer mouse. The information may also include other types of data, such as, for example, text that may be input using a keyboard.

Output devices 170 may include one or more devices that may output information from the computing device 100. Examples of devices that may output information from the computing device 100 may include a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, neural stimulation device, printer (e.g., a three-dimensional (3D) printer, laser printer, inkjet printer), speaker, video projector, volumetric display device, plotter, actuator (e.g., electrical motor) or some other output device.

Output devices 170 may be directed by, for example, the processing logic 120, to output the information from the computing device 100. The information may be presented (e.g., displayed, printed) by output devices 170. The information may include, for example, graphical user interface (GUI) elements (e.g., windows, widgets, dialog boxes, or other GUI elements), graphical representations, pictures, text, or other information that may be presented by output devices 170. Note that the information may be presented on output devices 170 in a stereoscopic view to enable, for example, a perception of depth.

Communication interfaces 180 may include one or more devices that contain logic that may (1) interface the computing device 100 with, for example, one or more communication networks and (2) enable the computing device 100 to communicate with one or more devices connected to the communication networks. An example of a communication network that may be used with computing device 100 will be described further below with respect to FIG. 8.

Communication interfaces 180 may include one or more transceiver-like mechanisms that enable the computing device 100 to communicate with devices connected to the communication networks. Communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, or other device suitable for interfacing the computing device 100 to the communication networks.

The primary storage 130 is accessible to the processing logic 120 via bus 190. The primary storage 130 may be a non-transient tangible computer-readable media that may store information for processing logic 120. The information may include computer-executable instructions and/or data that may implement operating system (OS) 132, windows manager (WM) 134, an application 136 (APP), and a technical computing environment (TCE) 200. The instructions may be executed, interpreted, and/or otherwise processed by processing logic 120.

The primary storage 130 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

OS 132 may be a conventional operating system that may implement various conventional operating system functions. These functions may include, for example, scheduling one or more portions of APP 136 and/or TCE 200 to run on the processing logic 120, managing the primary storage 130, controlling access to various components associated with the computing device 100 (e.g., secondary storage 150, input devices 160, output devices 170, communication interfaces 180), and controlling access to data received and/or transmitted by these components.

Examples of operating systems that may be used to implement OS 132 include, but are not limited to, the Linux operating system, Microsoft Windows operating system, the Symbian operating system, Mac OS, Chrome OS, and the Android operating system. A version of the Linux operating system that may be used is Red Hat Linux available from Red Hat Corporation, Raleigh, N.C. Versions of the Microsoft Windows operating system that may be used include Microsoft Windows 7, Microsoft Windows Vista, Microsoft Windows Phone, and Microsoft Windows XP operating systems available from Microsoft Inc., Redmond, Wash. The Chrome OS and Android operating systems are available from Google, Inc., Mountain View, Calif. The Mac OS operating system is available from Apple Inc., Cupertino, Calif. The Symbian operating system is available from the Symbian Foundation, London, United Kingdom.

WM 134 may be a conventional window manager that may manage GUI elements, such as widgets, dialog boxes, and windows, that may be part of the OS 132, TCE 200, and/or APP 136. The GUI elements may be displayed on an output device 170. The WM 134 may also be configured to (1) capture one or more positions of interactions with an input device 160 and/or other data associated with the input device 160, and (2) provide the positions and/or data to, for example, OS 132, APP 136, and/or TCE 200. The positions and/or data may be provided in messages that are sent to the OS 132, APP 136, and/or TCE 200. Examples of window managers that may be used to implement WM 134 may include, but are not limited to, X windows, GNOME, and KDE, which are often used with the Linux operating system, and window managers used with the Microsoft Windows XP, Microsoft Windows Vista, Microsoft Windows Phone, and Microsoft Windows 7 operating systems. It should be noted that other window managers or components that implement various functions associated with window managers may be used to implement WM 134.

APP 136 may be designed to perform a particular task or tasks. APP 136 may be an executable and/or interpretable version of a software application that may be written in one or more programming languages. The programming languages may include, for example, C, C++, JAVA®, MATLAB® language, C#, or some other programming language. Some or all of APP 136 may be written by a user of computing device 100, supplied by a vendor, or generated by TCE 200. Some or all of APP 136 may operate (e.g., execute) under the control of OS 132 and/or TCE 200. APP 136 may include computer-executable instructions and/or data that may implement one or more embodiments of the invention.

Figure 2:
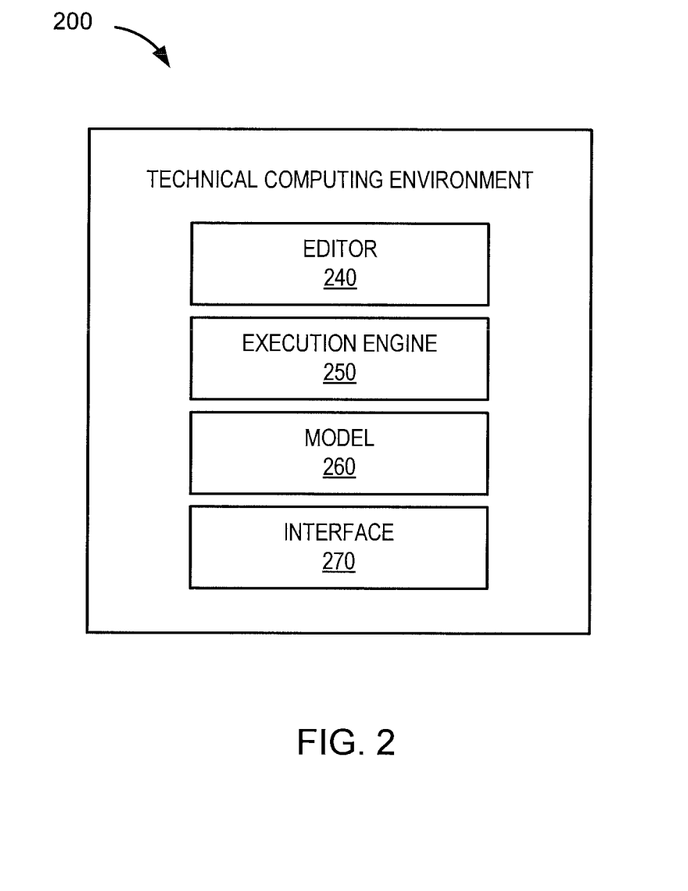
FIG. 2 illustrates a block diagram of an example of a technical computing environment (TCE) that may implement one or more embodiments of the invention.

TCE 200 may provide a computing environment that may allow, for example, a user to perform tasks related to disciplines, such as, but not limited to, mathematics, science, engineering, medicine, business, biology, and finance. TCE 200 may use an array as a basic element, where the array may not require dimensioning. These arrays may be used to support array-based programming where an operation may apply to an entire set of values included in the arrays. Array-based programming may allow array-based operations to be treated as a high-level programming technique that may allow, for example, operations to be performed on entire aggregations of data without having to resort to explicit loops of individual non-array operations.

TCE 200 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

$A=[1,2]$ $A=[1.1,2.2,3.3]$

Now suppose the program is executed. During run-time, when the statement "A=[1, 2]" is executed the data type of variable "A" may be a 1-by-2 array containing elements whose data type are integer. Later, when the statement "A=[1.1, 2.2, 3.3]" is executed, since the language is dynamically typed, the data type of variable "A" may be changed from the above 1-by-2 array to a 1-by-3 array containing elements whose data type are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 200 may perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, discrete event analysis and/or design, and state-based analysis and/or design.

TCE 200 may provide mathematical functions and/or graphical tools that may be used for creating plots, surfaces, images, volumetric representations, or other representations. TCE 200 may provide these functions and/or tools using toolboxes (e.g., toolboxes for signal processing, image processing, data plotting, and/or parallel processing). In addition, TCE 200 may provide these functions as block sets. TCE 200 may also provide these functions in other ways, such as via a library, local or remote database, and so on.

FIG. 2 illustrates an example embodiment of TCE 200. Referring to FIG. 2, TCE 200 may comprise various components, which may include an editor 240, an execution engine 250, a model 260, and an interface 270. Note that FIG. 2 illustrates an example embodiment of TCE 200. Other embodiments of TCE 200 may contain, for example, more components or fewer components than the components illustrated in FIG. 2. Moreover, in other embodiments of TCE 200, functions performed by the various components contained in TCE 200 may be distributed among the components differently, than described herein.

Examples of TCEs that may be adapted to implement one or more embodiments of the invention may include, but are not limited to, MATLAB®, Simulink®, Stateflow®, Simscape™, SimMechanics™, and SimEvents®, which are available from MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica or Dymola from Dynasim AB; VisSim from Visual Solutions; SoftWIRE from Measurement Computing Corporation; WiT from DALSA Coreco; Advanced Design System, VEE Pro, and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; Working Model 2D from Design Simulation Technologies, Inc.; Working Model from Design Simulation Technologies, Inc.; Computer Aided Three-dimensional Interactive Application (CATIA) and SolidWorks from Dassault Systems; and Ptolemy from the University of California at Berkeley.

Editor 240 may be a block diagram editor that may allow, for example, a user, to specify, edit, annotate, save, publish, and/or print model 260. For example, a block diagram of model 260 may be presented (e.g., displayed) and the editor 240 may contain one or more provisions for specifying, editing, annotating, saving, publishing, and/or printing the block diagram. Note that editor 240 may contain provisions for specifying, editing, annotating, saving, publishing, and/or printing the block diagram graphically and/or textually. In addition, editor 240 may contain one or more provisions for editing code (e.g., source code), requirements, and/or tests that may be generated from or otherwise associated with model 260.

The execution engine 250 may use model 260 to simulate some or all of the system represented by model 260. The simulation may include performing various computations, associated with the system, based on information (e.g., geometry information) associated with one or more modeling elements contained in model 260. The computations may include, but are not limited to, computations of dynamics, statics, equilibrium, mass, inertia, collision detection, collision response, and/or force fields associated with the system.

Model 260 may be, for example, a time-based graphical block diagram model, a state transition diagram, a discrete event model, an activity diagram, a Unified Modeling Language (UML) diagram, a sequence diagram, a data flow model, or some other type of model or diagram. Model 260 may represent a system, such as a physical system. Model 260 may be graphical, textual, or some combination of graphical and textual. The system represented by model 260 may be dynamic, linear, non-linear, or some other type of system.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing systems, and a stock market.

The system represented by model 260 may have various execution semantics that may be represented in model 260 as a collection of modeling elements, often referred to as blocks. A block may generally refer to a portion of functionality that may be used in model 260. The block may be graphically represented, however, it can be appreciated that the block does not necessarily need to be represented graphically. For example, the block may be represented textually or stored in some form of internal representation. Also, a particular visual depiction used to represent the block, for example in a graphical block diagram, may be an arbitrary design choice.

A block may be hierarchical in that the block itself may comprise one or more blocks that make up the block. A block comprising one or more blocks (sub-blocks) may be referred to as a subsystem block. A subsystem block may be configured to represent a subsystem of the overall system represented by the model.

Many object-oriented programming languages contain provisions for using objects to represent entities that may be manipulated using programs (e.g., applications) written in the programming languages. An object may be an instance of a class where the class may define characteristics of the object and/or behaviors of the object. A class is typically defined using a class definition. A class definition may include one or more properties and/or class functions. The properties may represent characteristics or data associated with the class or with instances of the class and the class functions may implement behaviors of the class. Examples of properties may include JAVA fields, MATLAB language properties, C# properties, C# fields, and C++ data members. Examples of class functions may include JAVA methods, MATLAB language methods (including static methods), C# methods, and C++ member functions (including static member functions).

A class may include a constructor function. A constructor function may be a type of class function that may be called (invoked) during a creation of an instance of the class. The constructor function may be called at a particular time during the lifetime of the instance. For example, the constructor function may be called during the instance's creation. The constructor function may perform various acts, such as, for example, setting values of various properties associated with the instance.

The following example may be helpful in understanding concepts described above. Suppose, for example, that APP 136 is written in an object-oriented programming language. APP 136 may contain a class definition that defines a class. Suppose the class definition defines a class named "Dog", which may be defined to represent a dog. The class definition may include a property named "Tail", which may represent a type of the tail that the dog has, and a property named "Color", which may represent the color of the dog. A behavior associated with the class "Dog" may be a sound the dog makes when it "speaks". The class definition may include a class function that implements this behavior. Given the above, a class definition for the class "Dog" may be specified as follows:

```
classdef Dog
    properties
        Tail
        Color;
    end
    methods
        function d = Dog(tail, color)
            d.Tail = tail;
            d.Color = color;
        end
        function Speak( )
            printf('Bark');
        end
    end
end
```

In addition to the above class definition, APP 136 may include the following code:

```
Sparky=Dog('Curly','Brown');
```

This code may be used to create an object named "Sparky" that is an instance of the class "Dog". During creation of the object, the constructor function (named "Dog") may be called with the parameters "Curly" and "Brown". The parameter "Curly" may be used to set the value of the object's "Tail" property and the parameter "Brown" may be used to set the value of the object's "Color" property. APP 136 may also include the code "Sparky.Speak( )" to call the object's "Speak" class function to print a sound that the dog (represented by object "Sparky") makes.

In some cases, it may be desirable to specify that a property of a class is immutable, which may mean that a value of the property may not be altered (e.g., changed, assigned, established) in an instance of the class after the instance has been created. An instance may be created when, for example, an instance of the class is constructed, copied, and/or loaded into memory (e.g., from a file).

For example, suppose that dogs are quadrupeds and that this characteristic of dogs is not likely to change. The above "Dog" class in APP 136 may be modified to include a property named "Locomotion" that may be defined (e.g., in the class definition) as immutable and whose value may be set to "quadruped" in the class's constructor function. The modified class definition in APP 136 may be specified as follows:

```
classdef Dog
    properties
        Tail
        Color;
    end
    properties (SetAccess = immutable)
        Locomotion;
    end
    methods
        function d = Dog(tail, color)
            d.Tail = tail;
            d.Color = color;
            d.Locomotion = 'quadruped';
        end
        function Speak( )
            printf("Bark");
        end
    end
end
```

Note that the modified class definition contains the directive "SetAccess=immutable", which may be used to specify that the "Locomotion" property is immutable. Also note that the modified class definition contains code in the constructor function to set the value of the "Locomotion" property to 'quadruped'. This assignment may be allowed by the APP 136 because it is performed in the constructor function. If APP 136 where to contain, for example, the code "Sparky.Locomotion='biped'" outside of the constructor function, the code may be treated as an attempt to alter the value of an immutable property (i.e., "Locomotion"), associated with an instance named "Sparky", outside of the constructor function and/or an attempt to alter the value of the immutable property after the instance named "Sparky" is created. Such attempts may be disallowed and may lead to an error being reported (e.g., an error message being displayed, exception condition generated).

A TCE, such as TCE 200, and/or an application, such as APP 136, may support many different types of classes. The supported classes may include, for example, value classes and handle classes.

A value class may be defined such that when an instance of a value class is assigned to a variable or passed as a function parameter, a copy of the instance is actually assigned to the variable or passed as the function parameter, respectively. The copy of the instance may include a copy of each property value from the original instance.

A handle class may be defined such that when an instance of a handle class is assigned to a variable or passed as a function parameter, a copy of a handle for the instance (e.g., a pointer to the instance) is actually assigned to the variable or passed as the function parameter, respectively. Thus, in a handle class, a copy of the underlying properties is not made when assigning a handle class instance to a variable or passing a handle class instance as a function parameter. Multiple variables and parameters may reference the same handle class instance and thus may reference the same data values stored in properties of the handle class instance.

An enumeration may be defined as a data type having a set of named instances. A named instance may be referred to as an enumerant. For example, consider the following code:

```
enum Boolean {false, true};
Boolean foo = false;
```

The code "enum Boolean {false, true}" defines a data type "Boolean" that is an enumeration having enumerants "false" and "true". The code "Boolean foo=false" declares a variable named "foo" that is of the "Boolean" data type and assigns the value "false" to the variable. Note that since the "Boolean" data type is declared as an enumeration, variables declared of that data type may only hold values of enumerants in the enumeration. Thus, in the above example, the variable "foo" may only hold the values "false" and "true".

An enumeration class may be a class that represents an enumeration. An instance of the enumeration class may represent an enumerant defined in the enumeration. For example, consider the following class definition of an enumeration class named "WeekDays":

```
classdef WeekDays
    enumeration
        Monday, Tuesday, Wednesday, Thursday, Friday
    end
end
```

The enumeration class contains the following enumerants "Monday", "Tuesday", "Wednesday", "Thursday", and "Friday".

An instance of an enumeration class may be based on an enumerant defined in the enumeration class. The following code may be used to assign an instance of the above enumeration class to a variable named "today":

today=WeekDays.Tuesday

Note that in the above code, the variable named "today" is assigned the instance "Tuesday".

An enumeration class may contain properties and/or class functions. An enumeration class may also be a value class or a handle class. Values of properties associated with an instance of an enumeration class, which is also a value class, may not be allowed to change. Doing so may cause the enumeration class to expand beyond its definition. Explained another way, an enumeration class may define a finite set of named instances. An enumeration class may also define a property that is associated with an instance of the enumeration class. For an enumeration class, which is also a value class, the enumeration class may define a value that the property may have for a particular named instance. If it were possible to assign a different value to that property, then it would be possible to expand the enumeration class beyond its definition and the finite set would not actually be finite.

Figure 3:
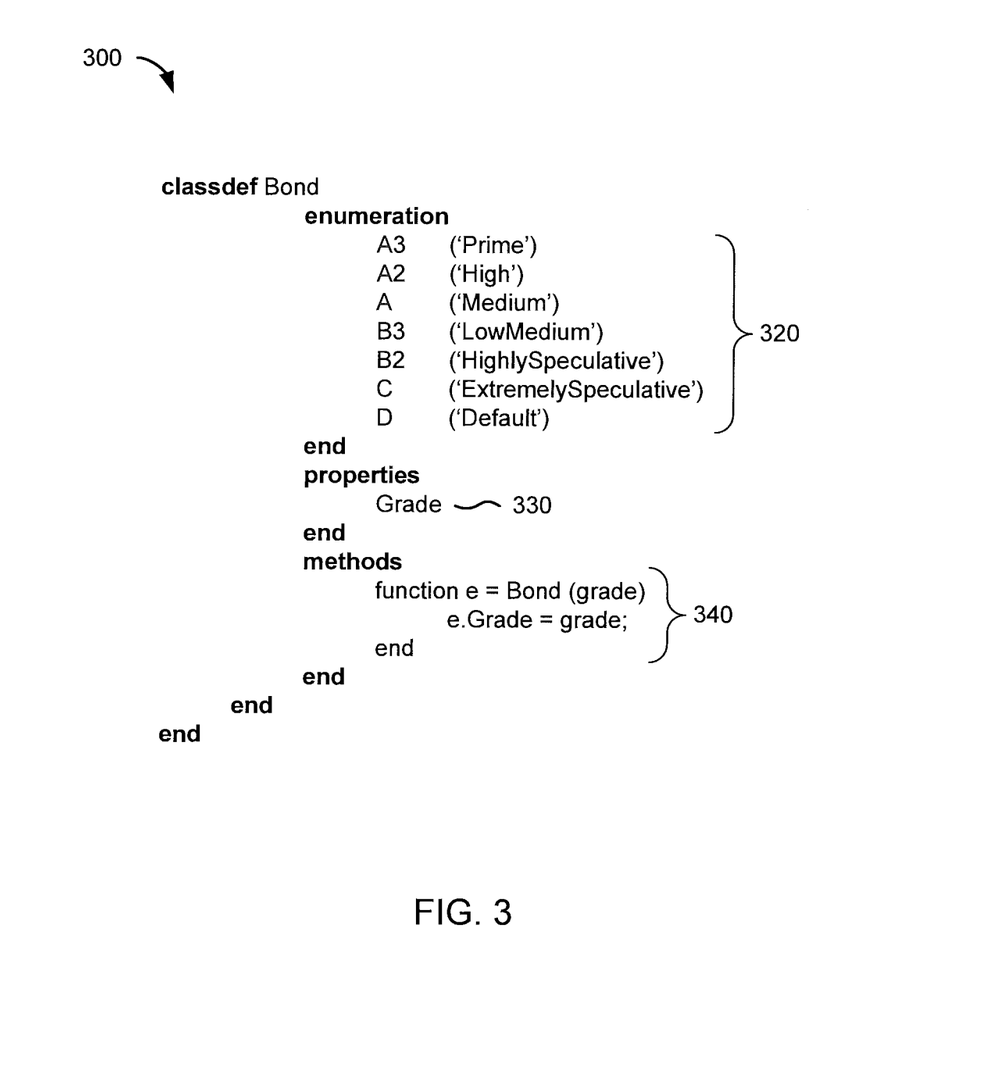
FIG. 3 illustrates an example of a class definition of a class where a property of the class is implicitly declared as immutable.

For example, FIG. 3 illustrates an example of a class definition 300 of an enumeration class that is also a value class. The class definition 300, for example, may be part of APP 136, entered into TCE 200 via interface 270 or editor 240, or read by TCE 200 from storage, such as primary storage 130 or secondary storage 150. Referring to FIG. 3, the enumeration class is named "Bond". The class definition 300 includes an enumeration 320. Enumerants in the enumeration 320 include "A3", "A2", "A", "B3", "B2", "C" and "D", which are associated with the values "Prime", "High", "Medium", "LowMedium", "HighlySpeculative", "ExtremelySpeculative", and "Default", respectively. The enumeration class includes an immutable property 330 named "Grade", which holds a value associated with an instance of the enumeration class. The enumeration class also includes a constructor function 340, which may be called during a creation of an instance of the enumeration class. The constructor function 340 may establish the value of the "Grade" property associated with the instance.

The "Grade" property 330 may be treated as immutable because if it were treated as mutable the set of values in the enumeration class "Bond" could be expanded, which may be undesirable. The immutability of the "Grade" property 330 may be enforced by, for example, an application (e.g., APP 136) and/or an environment (e.g., TCE 200) that may support the enumeration class.

Figure 4:
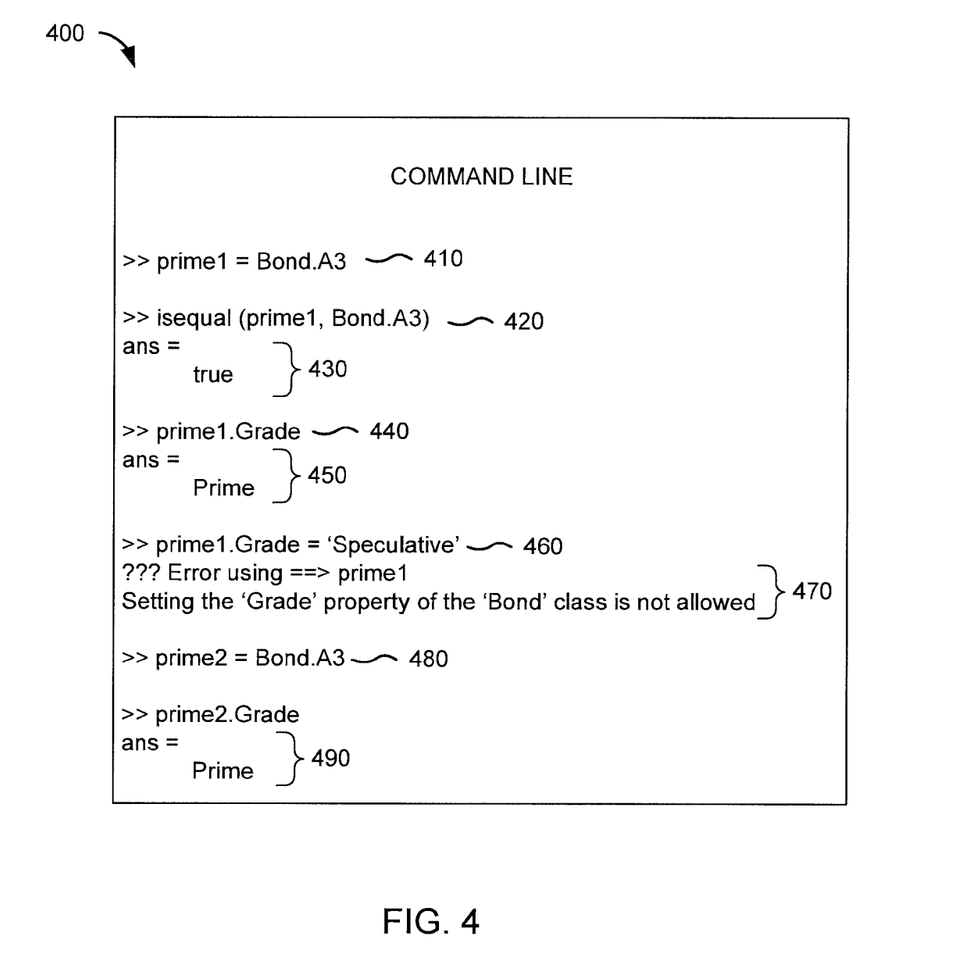
FIG. 4 illustrates example commands that may be used to exemplify immutability of a property contained in an instance of the class illustrated in FIG. 3.

For example, FIG. 4 illustrates example commands that may be entered into TCE 200 to assign instances of the above "Bond" class to various variables. The commands may be entered into TCE 200 via interface 270. Referring to FIGS. 3 and 4, interface 270 may provide a command line interface that may enable the commands to be entered. The commands may be processed by TCE 200. Processing may include enforcing immutability of the "Grade" property 330 for instances of the "Bond" class.

The command at line 410 may be used to assign an instance of the enumerant "A3" to a variable named "prime1". During the assignment, the constructor function 340 may be called and the "Grade" property 330 for the instance may be set to the value "Prime".

The command at line 420 may be used to check whether the variable named "prime1" is equal to the enumerant "A3". The answer provided by the TCE 200 at line 440 provides an indication that this condition is true.

At line 440, "prime1.Grade" is entered to display the value of the "Grade" property 300. At line 450, the TCE 200 provides an answer that indicates that the value of the "Grade" property 330 is "Prime".

Since the "Bond" class is a value class, TCE 200 may treat the "Grade" property 330 as immutable to disallow attempts to alter the value of the property 330 outside the constructor function 340. For example, the command at line 470 attempts to set the value of the "Grade" property 330 to "Speculative". TCE 200 may enforce the immutability of the property 330 by disallowing this attempt. In addition, as indicated at line 480, the TCE 200 may report an error by displaying an error message indicating that the attempt to set the value of the property 330 is not allowed.

Now suppose that the command at line 480 is entered to assign an instance of the enumerant "A3" to a variable named "prime2". As indicated at line 490, the value of the "Grade" property 330 for the second instance is also set to "Prime". Note that this value was set by the constructor function 340 when the instance of the enumerant was created.

For a particular instance of an enumerant in an enumeration class, a constructor function associated with the enumeration class may be called once to assign values to properties associated with the instance. For example, the constructor function may be called when an instance of the enumerant is assigned to a first variable. A later assignment of the instance to a second variable may not cause the constructor function to be called.

Alternatively, the constructor function may be called each time a particular instance of the enumerant is assigned to a variable, thus, properties associated with the instance may be assigned values each time the instance is assigned to a variable. Here, for example, an assignment of the instance to a first variable would cause the constructor function to be called and properties associated with the instance may be assigned values. A later assignment of the instance to a second variable would also cause the constructor function to be called and properties associated with the instance may be assigned the same values.

Since in addition to being an enumeration class, the "Bond" class is also a value class, a variable assigned to an instance of the enumerant "A3" has its own copy of the "Grade" property. Thus, the variable named "prime1" has its own copy of the "Grade" property and the variable named "prime2" has its own copy of the "Grade" property.

If the immutability of the "Grade" property was not enforced, the command at line 460 would have caused the value of the copy of the "Grade" property for the variable named "prime1" to be set to "Speculative". This would have created an instance that is distinct from the enumerants defined by the enumeration 320. For example, in the enumeration 320, the enumerant "A3" is defined as having a "Grade" property whose value is "Prime". However, if the immutability for the "Grade" property was not enforced at line 460, "prime1.Grade" would have been assigned the value "Speculative". Note that the enumeration 320 does not include an enumerant "A3" which has a "Grade" property whose value is defined as "Speculative". Thus, allowing the assignment at line 460 would create an instance of an enumeration class that is not part of the enumeration 320 defined in the class definition 300.

It should also be noted that, in this example, the enumeration 320 is defined as containing a pre-defined fixed set of enumerants. Thus, attempting to add an enumerant that is not defined in the enumeration 320 may not be allowed, because allowing such may, for example, allow an enumerant to be added to the pre-defined fixed set of enumerants. Therefore, in response to the attempt at line 460 to change the value of "prime1.Grade" to "Speculative", TCE 200 may disallow the attempt and report an error.

Figure 5:
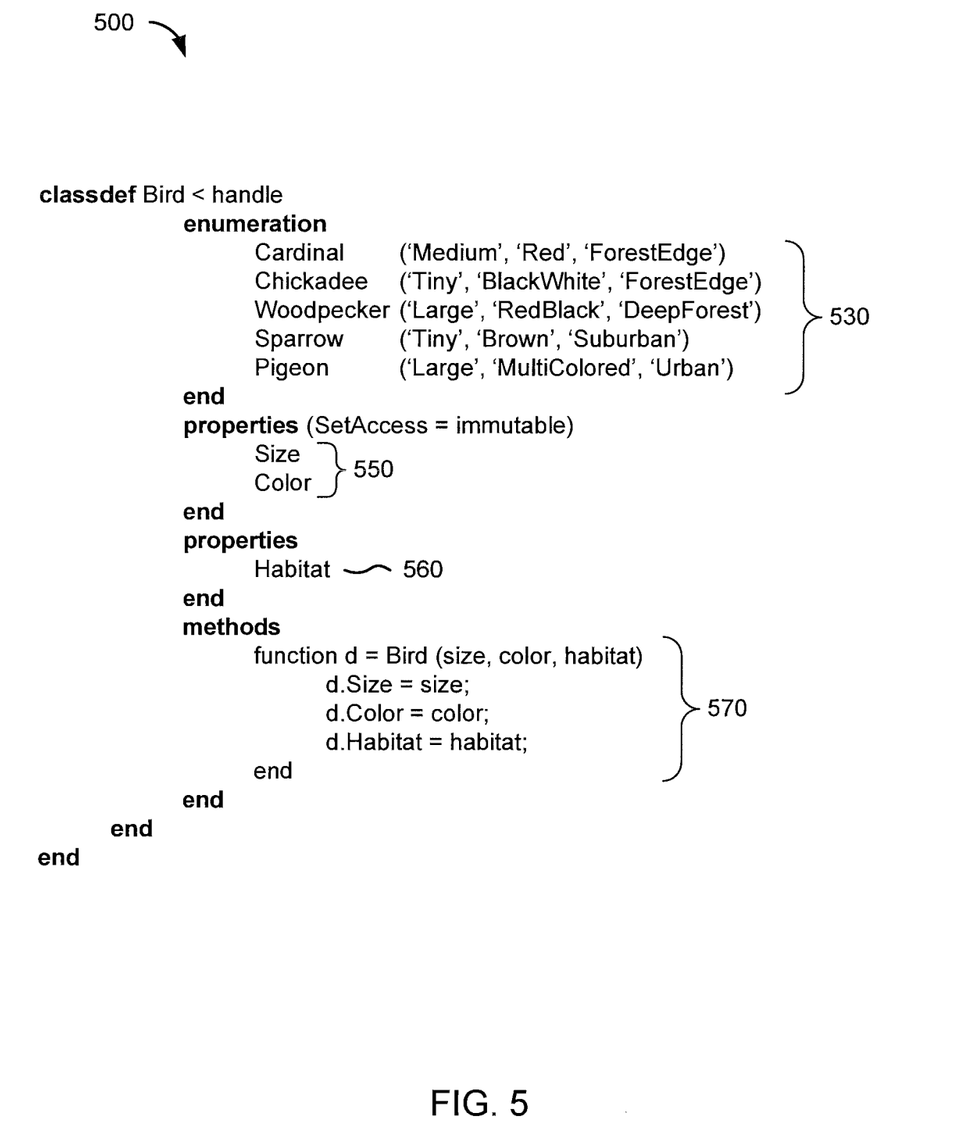
FIG. 5 illustrates an example of a class definition of a class where a property of the class is explicitly declared as immutable.

FIG. 5 illustrates an example of a class definition 500 of an enumeration class that is a handle class. The class definition 500, for example, may be part of APP 136, entered into TCE 200 via interface 270 or editor 240, or read by TCE 200 from storage, such as primary storage 130 or secondary storage 150. Referring to FIG. 5, the enumeration class is named "Bird". The class definition 500 includes an enumeration 530. The enumeration 530 includes the enumerants "Cardinal", "Chickadee", "Woodpecker", "Sparrow", and "Pigeon". The class includes immutable properties 550 named "Size" and "Color". The enumeration class also includes a mutable property 560 named "Habitat". Note that, in this example, the text "SetAccess=immutable" is used to explicitly declare the properties "Size" and "Color" as immutable. Also in this example, omitting the text impliedly declares the property as mutable. It should be noted that other ways of declaring properties as immutable or mutable may be used.

The class definition 500 also includes a definition of a constructor function 570. Function 570 may be called during a creation of an instance of an enumerant in the class. Function 570 establishes (e.g., sets) values for the immutable properties 550 and an initial value for the mutable property 560.

Since the class is a handle class, the mutability of the "Habitat" property does not create additional enumerants for the class because (1) for a given instance of the enumeration class, only one copy of the instance is maintained and (2) variables that are assigned the instance point to that copy. Thus, in an enumeration class that is also a handle class, if the value of a mutable property is changed for a particular enumerant, all variables that are assigned that instance "see" the changed value.

Figure 6:
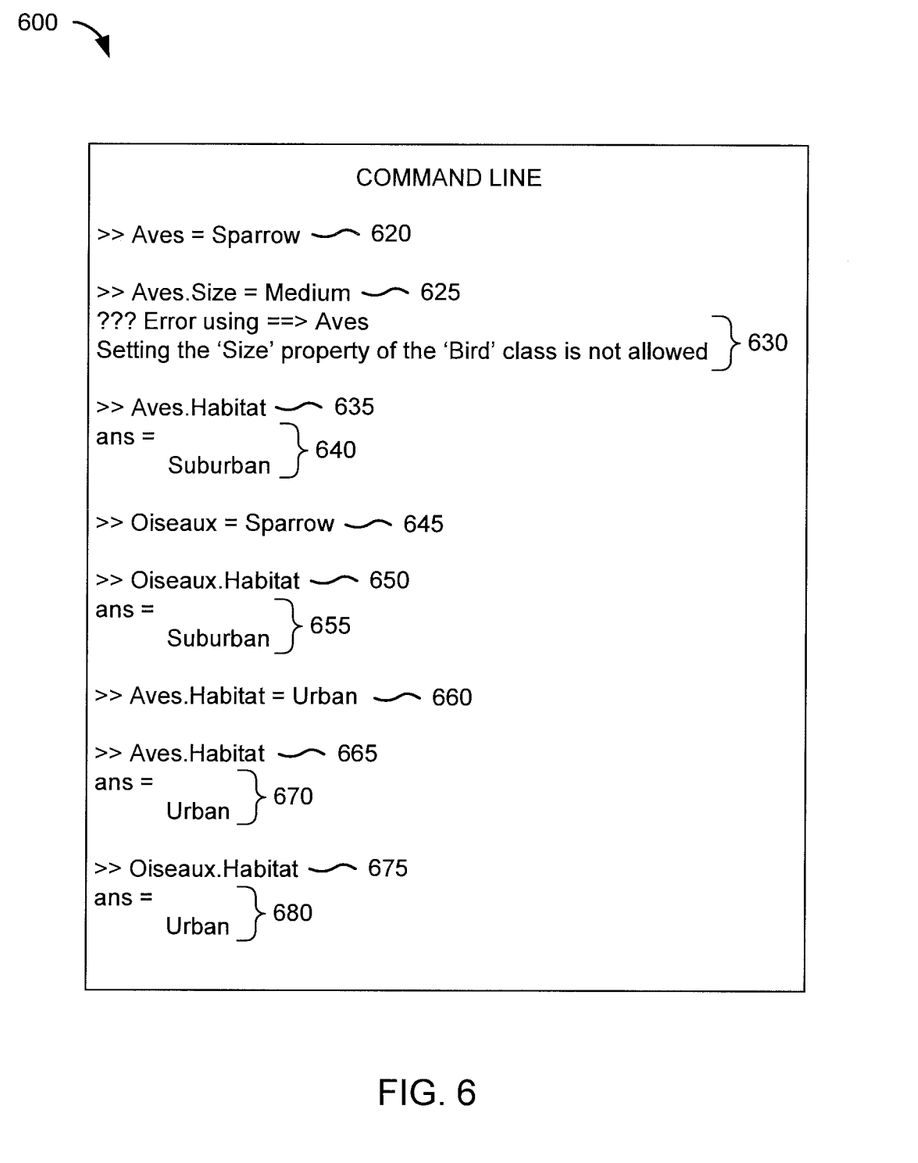
FIG. 6 illustrates example commands that may be used to exemplify immutability of a property contained in an instance of the class illustrated in FIG. 5.

FIG. 6 illustrates example commands that may be used to illustrate concepts described above. As above, the commands may be entered into TCE 200 via interface 270. Referring to FIGS. 5 and 6, at line 620, a variable named "Ayes" is assigned an instance of the enumerant "Sparrow" in the enumeration class "Bird". At line 625, an attempt is made to set the value of the "Size" property associated with the instance to "Medium". Since the "Size" property is immutable (note in FIG. 5, the property is declared as such), the attempt is disallowed by the TCE 200. Moreover, TCE 200 may report an error condition in response to the attempt. In this example, TCE 200 reports the error condition by displaying an error message (line 630).

At line 635, "Aves.Habitat" is entered to display the value of the "Habitat" property for the variable named "Ayes". The value may be displayed by the TCE 200 in the form of an answer, as illustrated at line 640. At this point, the value of the "Habitat" property is set to "Suburban", which was the value that was set by the constructor function 570 during the creation of the "Sparrow" instance.

At line 645, a second variable named "Oiseaux" is assigned the instance of the enumerant "Sparrow". At line 650, "Oiseaux.Habitat" is entered to display the value of the "Habitat" property for the variable named "Oiseaux". The value displayed, at line 655, is "Suburban", which is the value that was set by the constructor function 570 during the creation of the instance "Sparrow".

At line 660, the value of the "Habitat" property is set to "Urban". Note that since the "Habitat" property is mutable, the TCE 200 allows this change to be made.

At line 665, "Aves.Habitat" is again entered to display the value of the "Habitat" property for the variable named "Ayes". Note that, at line 670, the value has changed to "Urban", which was the value set at line 660.

At line 675, "Oiseaux.Habitat" is entered to display the value of the "Habitat" property for the variable named "Oiseaux". Note that the value of the "Habitat" property is also "Urban". This is because the "Ayes" and "Oiseaux" point to the same instance of the enumerant "Sparrow". Thus, in this example, a change made to the value of a mutable property of the instance "Sparrow" is "seen" by both the "Ayes" and "Oiseaux" variables.

Also note that a new enumerant is not created for the enumeration 530 by changing the value of the "Habitat" property because there is only one copy of the "Habitat" property for the instance "Sparrow". In the above example, in order for a new enumerant to be created, there would have to be more than one copy of the "Habitat" property, where one of the copies is set to "Suburban" and another copy is set to "Urban". Since in the above example, only one copy exists, changing the value of the copy does not cause a new enumerant to be created.

Figure 7:
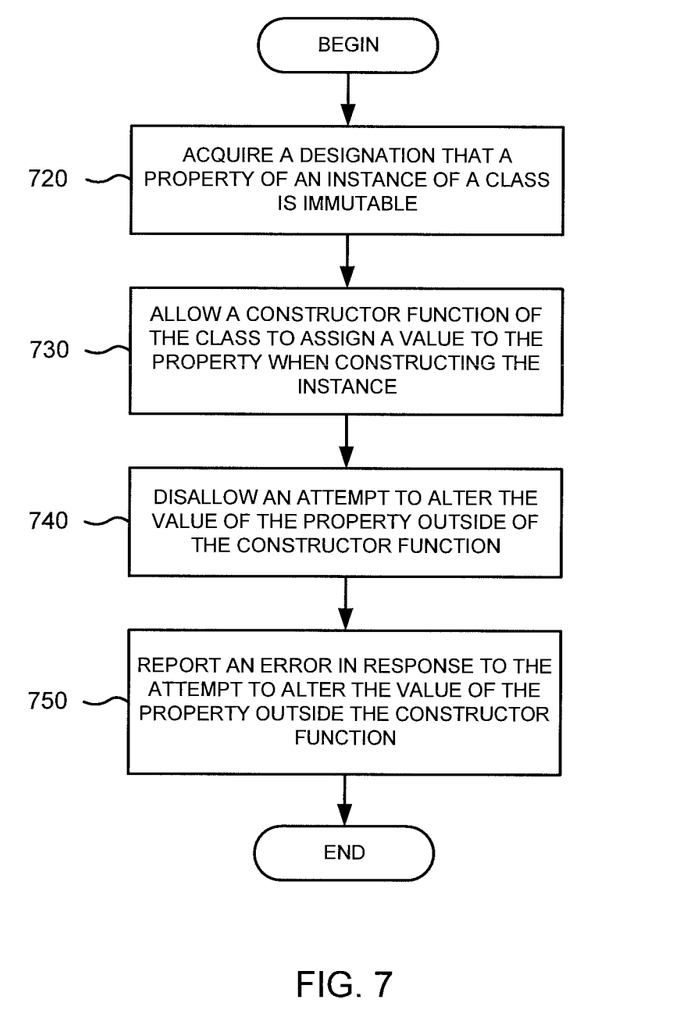
FIG. 7 illustrates a flowchart of example acts that may be used to (1) acquire a designation that a property, associated with an instance of a class, is immutable, and (2) in response to the designation, restrict establishment of a value of the property to a constructor function that may be called during construction of the instance.

FIG. 7 illustrates a flowchart of example acts that may be used to (1) acquire a designation that a property, associated with an instance of a class, is immutable, and (2) in response to the designation, restrict establishment (e.g., setting) of a value of the property to a constructor function that may be called during a construction of the instance. Referring to FIG. 7, at block 720, a designation that a property of an instance of a class is immutable is acquired. The property may be, for example, dynamically typed or statically typed. The designation may be, for example, explicit or implicit. The class may be an enumeration class.

The designation may be a directive that explicitly specifies the property as being immutable. The directive may be specified in a class definition for the class. For example, in class definition 500 (FIG. 5), the directive "SetAccess=immutable" is used to explicitly specify that the properties "Size" and "Color", declared at line 550, are immutable.

An example of an implicit designation may be a class's type. For example, as noted above, the "Bond" class (FIG. 4) is an enumeration class that is also a value class. The property "Grade" 330 may be impliedly designated as being immutable by virtue of the enumeration class being declared as a value class or not being declared as a handle class.

The designation may be maintained as an attribute of a property. For example, the "Grade" property may be associated with various attributes. These attributes may include an attribute that indicates whether the property is immutable. An application, such as APP 136, or TCE, such as TCE 200, may use the attribute to determine whether the property of an instance of the class is immutable and may thereby allow (e.g., grant) or disallow (e.g., deny), for example, an attempt to set a value of the property after constructor function 340 is called during a creation (e.g., construction) of the instance. Note that creation of the instance may include, for example, creating the instance from a copy of another instance of the class, creating the instance by loading it into memory (e.g., from a file), or otherwise creating the instance. Alternatively, a TCE or application may use another any kind of designation to specify that a property is immutable. For example, "immutable" or some other keyword may be inserted before or after a property name.

The designation may be acquired by, for example, reading the designation from a file, receiving the designation via a command line interface, receiving the designation over a communication network, or otherwise acquired. For example, the class definition 500 for the "Bird" class (FIG. 5) may be contained in a file that may be stored in storage, such as primary storage 130 or secondary storage 150. While processing the file, TCE 200 may acquire the designation (e.g., "Set Access=immutable") by reading it from the file. TCE 200 may associate the designation with properties "Size" and "Color" in instances of the "Bird" class.

The class definition 300 for the "Bond" class (FIG. 3) may also be contained, for example, in a file that may be stored in storage, such as primary storage 130 or secondary storage 150. The TCE 200 may read the class definition 300 from the file and determine that the class is a value class in addition to being an enumeration class. Based on this determination, the TCE 200 may infer that the class definition 300 implicitly designates that the properties of the class are immutable.

At block 730, a constructor function of the class is allowed to assign a value to (e.g., set the value of) the property when constructing an instance of the class. The constructor function may be allowed to assign the value to the property in response to the designation. For example, as noted above, the "Grade" property 330 (FIG. 3) is implicitly designated as immutable. In response to this designation, code in the constructor function 340 is allowed to set the value of the "Grade" property 330 of an instance of the "Bond" class during the instance's creation. Likewise for example, as noted above, the "Size" and "Color" properties of the "Bird" class (FIG. 5) are designated as being immutable. In response to this designation, code in the constructor function 570 in the "Bird" class is allowed to set the values of the "Size" and "Color" properties of an instance of the "Bird" enumeration class during the instance's creation.

At block 740, an attempt to alter the value to the property outside the constructor function is disallowed. The attempt may be disallowed in response to the property being designated as immutable. For example, referring back to FIGS. 3 and 4, as noted above the "Grade" property 330 in the "Bond" class is implicitly designated as immutable. At line 460, an attempt is made outside the constructor function 340 to set the "Grade" property 330 to "Speculative". In response to the "Grade" property 330 being designated as immutable, TCE 200 may disallow this attempt because the assignment is being made to the property outside of the constructor function. Likewise, for example, referring to FIGS. 5 and 6, as noted above, the "Size" property in the enumeration class "Bird" is designated as immutable. At line 625, an attempt is made outside of the constructor function 570 to set the "Size" property to "Medium". In response to the "Size" property being designated as immutable, TCE 200 may disallow this attempt because the assignment is being made to the property outside of the constructor function.

At block 750, an error is reported in response to the attempt to assign the value of the property outside the constructor function. The error may be reported, for example, by generating an exception condition, throwing the error, logging the error, and/or via an error message. For example, in FIG. 4 the error message at line 470 may be displayed on an output device 170 by the TCE 200 in response to the TCE 200 disallowing the above attempt to assign the value "Speculative" to the "Grade" property. It should be noted that other ways of reporting the error may be used.

Figure 8:
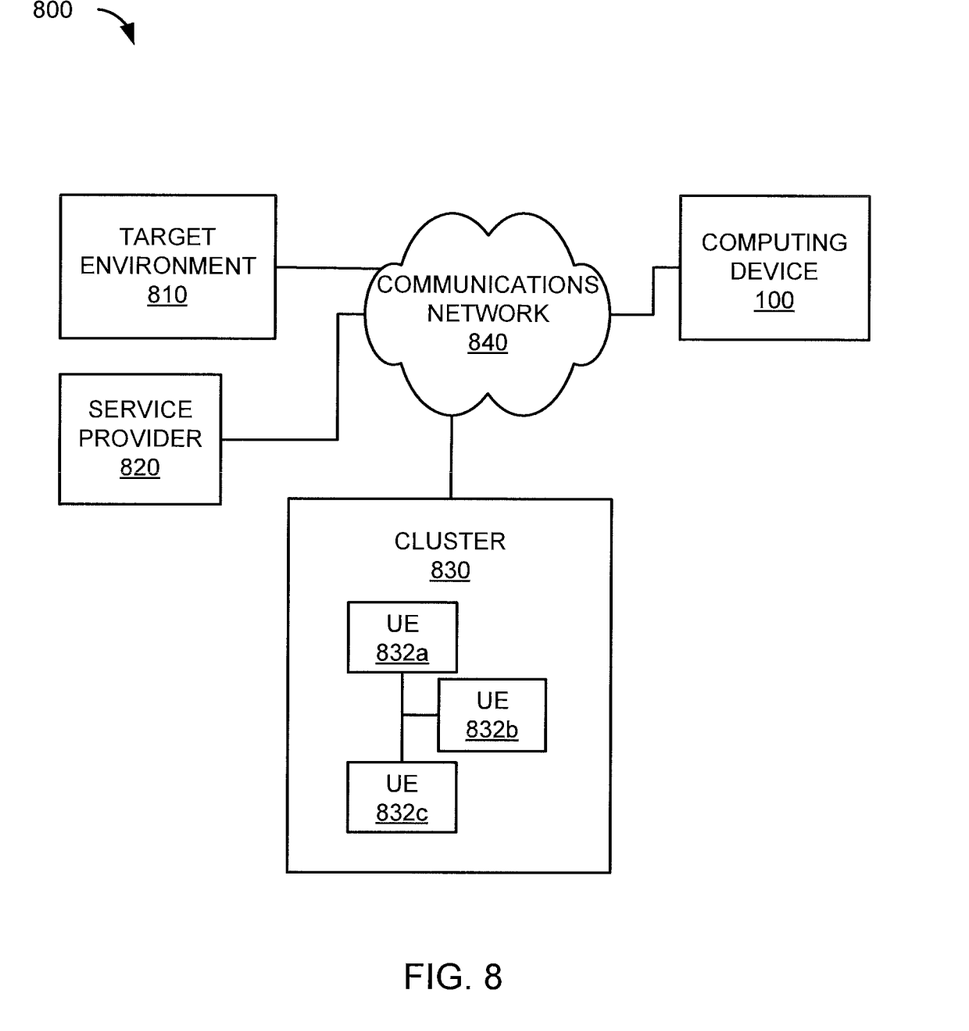
FIG. 8 illustrates a block diagram of an example of a distributed computing environment that may implement one or more embodiments of the invention.

One or more embodiments of the invention may be implemented in a distributed environment. FIG. 8 illustrates an example of a distributed environment 800 that may implement one or more embodiments of the invention. Referring to FIG. 8, environment 800 may contain various components including computing device 100, target environment 810, service provider 820, cluster 830, and communications network 840. Note that the distributed environment 800 is just one example of a distributed environment that may be used with one or more embodiments of the invention. Other distributed environments that may be used with one or more embodiments of the invention may contain more components or fewer components than illustrated in FIG. 8. Moreover, the components in the distributed environments may be arranged differently than the arrangement shown in FIG. 8. In addition, the distributed environments may implement various "cloud computing" frameworks.

Details of computing device 100 were described above with respect to FIG. 1. In distributed environment 800, computing device 100 may, among other things, exchange information (e.g., data) with other components in the communications network 840 (e.g., target environment 810, service provider 820, and cluster 830). Computing device 100 may interface with the communications network 840 via a communication interface 180.

Target environment 810 may be configured to interpret and/or execute, for example, one or more embodiments of the invention, which may be generated in or otherwise made available to the distributed environment 800. The communications network 840 may include digital and/or analog aspects. Information exchanged in communications network 840 may include machine-readable information having a format that may be adapted for use, for example, in the communications network 840 and/or with one or more components in the communications network 840.

For example, the information may be encapsulated in one or more packets that may be used to transfer the information through the communications network 840. Information may be exchanged between components in the communications network 840 using various communication protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, or other communication protocol.

The communications network 840 may comprise various network devices, such as gateways, routers, switches, firewalls, servers, repeaters, address translators, etc. Some or all of the communications network 840 may be wired (e.g., using wired conductors, optical fibers) and/or wireless (e.g., using free-space optical (FSO), radio frequency (RF), acoustic transmission paths). Portions of the communications network 840 may include a substantially open public network, such as the Internet. Portions of the communications network 840 may include a more restricted network, such as a private corporate network or virtual private network (VPN). It should be noted that implementations of communications networks and/or devices operating on communications networks described herein are not limited with regards to, for example, information carried by the communications networks, protocols used in the communications networks, and/or the architecture/configuration of the communications networks.

Cluster 830 may include a number of units of execution (UEs) 832 that may execute or interpret one or more embodiments of the invention or portions thereof on behalf of computing device 100 and/or another component, such as service provider 820. The UEs 832 may reside on a single device or chip or on multiple devices or chips. For example, the UEs 832 may be implemented in a single ASIC or in multiple ASICs. Likewise, the UEs 832 may be implemented in a single computer system or multiple computer systems. Other examples of UEs 832 may include, for example, some combination of FPGAs, CPLDs, ASIPs, processors, multiprocessor systems-on-chip (MPSoCs), graphic processing units, and/or microprocessors. The UEs 832 may be configured to perform operations on behalf of another component in the distributed environment 800. For example, in an embodiment, the UEs 832 are configured to execute portions of code associated with the TCE 200. Here, TCE 200 may dispatch certain activities pertaining to one or more embodiments of the invention to the UEs 832 for execution. The service provider 820 may configure cluster 830 to provide, for example, the above-described services to computing device 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to FIG. 7, the order of the acts may be modified in other implementations. Further, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain embodiments of the invention may be implemented as logic that performs one or more functions. This logic may be hardware-based, software-based, or a combination of hardware-based and software-based. Some or all of the logic may be stored in one or more tangible computer-readable storage media and may include computer-executable instructions that may be executed by processing logic, such as processing logic 120 (FIG. 1). The computer-executable instructions may include instructions that implement one or more embodiments of the invention. The tangible computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method, comprising:
    defining, by a computing device, a class of objects,
        the class of objects including:
            information identifying a first property,
            information identifying a second property, and
            information indicating that values for the first property are only allowed to be assigned using a constructor function of the class of objects,
    creating, by the computing device, an instance of an object of the class of objects,
        creating the instance of the object including:
            assigning a first value to the first property using the constructor function, and
            assigning a second value to the second property using the constructor function;

detecting, by the computing device, an attempt to assign, without using the constructor function, a third value to the first property for the instance of the object;

preventing, by the computing device, the third value from being assigned to the first property for the instance of the object based on detecting the attempt to assign the third value to the first property, for the instance of the object, without using the constructor function; and generating, by the computing device, an error based on detecting the attempt to assign, without using the constructor function, the third value to the first property for the instance of the object, the error not being generated when a fourth value is assigned, without using the constructor function, to the second property of the instance of the object.

2. The method of claim 1, further comprising:

displaying an error message based on detecting the attempt to assign the first property without using the constructor function.

3. The method of claim 2, where the error message indicates that the third value cannot be assigned to the first property.

4. The method of claim 1, where the first property is dynamically typed.

5. The method of claim 1, where the class of objects is a handle class.

6. The method of claim 1, wherein the class of objects is a value class.

7. The method of claim 1, where the class of objects further includes:

information identifying a third property, and information indicating that values for the third property are only allowed to be assigned using the constructor function of the class of objects.

8. The method of claim 7, further comprising:

assigning a value to the third property using the constructor function;

detecting an attempt to assign, without using the constructor function, another value to the third property;

preventing the other value from being assigned to the third property based on detecting the attempt to assign the other value to the third property without using the constructor function; and one or more instructions to display a message indicating that the other value cannot be assigned to the third property based on detecting the attempt to assign the other value to the third property without using the constructor function.

9. One or more non-transitory computer-readable media storing instructions, the instructions comprising:

a plurality of instructions which, when executed by a computing device, cause the computing device to:

define a class of objects, the class of objects including:

information identifying a first property, information identifying a second property, and information indicating that values for the first property are only allowed to be assigned using a constructor function of the class of objects;

create an instance of an object of the class of objects, one or more instructions, of the plurality of instructions, to create the instance of the object including:

one or more instructions to assign a first value to the first property using the constructor function;

one or more instructions to assign a second value to the second property;

detect an attempt to assign a third value to the first property without using the constructor function;

prevent the third value from being assigned to the first property for the instance of the object based on detecting the attempt to assign the third value to the first property, for the instance of the object, without using the constructor function; and generate an error based on detecting the attempt to assign the third value to the first property, for the instance of the object, without using the constructor function, the error not being generated when a fourth value is assigned, without using the constructor function, to the second property of the instance of the object.

10. The media of claim 9, where the instructions further comprise:

one or more instructions to display an error message based on detecting the attempt to assign the third value to the first property, for the instance of the object, without using the constructor function.

11. The media of claim 10, where the error message indicates that the third value cannot be assigned to the first property.

12. The media of claim 9, where the instructions further comprise:

one or more instructions to assign, without using the constructor function, the fourth value to the second property of the instance of the object.

13. The media of claim 9, where the instructions further comprise:

one or more instructions to display the information identifying the first property and the third value.

14. The media of claim 9, where the class of objects further includes:

information identifying a third property, and information indicating that values for the third property are only allowed to be assigned using the constructor function of the class of objects.

15. The media of claim 14, where the instructions further comprise:

one or more instructions to assign a value to the third property using the constructor function;

one or more instructions to detect an attempt to assign, without using the constructor function, another value to the third property;

one or more instructions to prevent the other value from being assigned to the third property based on detecting the attempt to assign the other value to the third property without using the constructor function; and one or more instructions to display a message indicating that the other value cannot be assigned to the third property based on detecting the attempt to assign the other value to the third property without using the constructor function.

16. The media of claim 9, where the first property is dynamically typed, and where the class of objects is a handle class.

17. A device comprising:

one or more processors to:

define a class of objects, the class of objects including:

information identifying a first property, information identifying a second property, and information indicating that values for the first property are only allowed to be assigned using a constructor function of the class of objects;

create an instance of an object of the class objects, when creating the instance of the object, the one or more processors are to:
assign a first value to the first property;
assign a second value to the second property;
detect an attempt to assign, without using the constructor function, a third value to the first property;
prevent the third value from being assigned to the first property based on detecting the attempt to assign the third value to the first property without using the constructor function; and
generate an error based on detecting the attempt to assign the third value to the first property without using the constructor function,
the error not being generated when a fourth value is assigned to the second property of the instance of the object without using the constructor function.

18. The device of claim 17, where the one or more processors are further to:
display an error message based on detecting the attempt to assign the third value to the first property without using the constructor function,
where the error message indicates that the third value cannot be assigned to the first property.

19. The device of claim 17, where the one or more processors are further to:
assign the fourth value to the second property of the instance of the object without using the constructor function.

20. The device of claim 17, where the class of objects further includes:
information identifying a third property, and
information indicating that values for the third property are only allowed to be assigned using the constructor function of the class of objects, and where the one or more processors are further to:
assign a value to the third property using the constructor function;
detect an attempt to assign another value to the third property without using the constructor function;
prevent the other value from being assigned to the third property based on detecting the attempt to assign the other value to the third property without using the constructor function; and
display a message indicating that the other value cannot be assigned to the third property based on detecting the attempt to assign the other value to the third property without using the constructor function.

* * * * *

UNITED STATES PATENT AND TRADEMARK OFFICE
CERTIFICATE OF CORRECTION

PATENT NO.      : 8,826,229 B2  Page 1 of 1
APPLICATION NO. : 13/151783
DATED           : September 2, 2014
INVENTOR(S)     : Foti It is certified that error appears in the above-identified patent and that said Letters Patent is hereby corrected as shown below:

In the Claims

Claim 2, Column 17, line 19, after "to assign" insert -- the third value to --.

Signed and Sealed this
Twenty-seventh Day of January, 2015

Michelle K. Lee
*Deputy Director of the United States Patent and Trademark Office*